United States Patent
Georges

(10) Patent No.: US 11,400,973 B2
(45) Date of Patent: Aug. 2, 2022

(54) COUPLING FOR MULTI-PIECE STEERING SYSTEM RACK

(71) Applicant: Steering Solutions IP Holding Corporation, Saginaw, MI (US)

(72) Inventor: William H. Georges, Saginaw, MI (US)

(73) Assignee: Steering Solutions IP Holding Corporation, Saginaw, MI (US)

(*) Notice: Subject to any disclaimer, the term of this patent is extended or adjusted under 35 U.S.C. 154(b) by 542 days.

(21) Appl. No.: 16/451,724

(22) Filed: Jun. 25, 2019

(65) Prior Publication Data

US 2020/0406966 A1    Dec. 31, 2020

(51) Int. Cl.
*B62D 7/16* (2006.01)
*B62D 33/02* (2006.01)
*B62D 3/12* (2006.01)

(52) U.S. Cl.
CPC ............. *B62D 7/163* (2013.01); *B62D 3/12* (2013.01); *B62D 3/126* (2013.01); *B62D 33/0207* (2013.01)

(58) Field of Classification Search
CPC .......... B62D 7/163; B62D 7/16; B62D 3/126; B62D 3/12; B62D 33/0207; F16H 19/043
USPC .......................................................... 74/109
See application file for complete search history.

(56) References Cited

U.S. PATENT DOCUMENTS

| | | | | |
|---|---|---|---|---|
| 7,850,178 B2* | 12/2010 | Fischer | ............... | B60G 7/003 280/86.758 |
| 8,770,602 B1* | 7/2014 | Belleau | ............... | B62D 7/20 280/93.51 |
| 2005/0201821 A1* | 9/2005 | Irrer | ............... | B62D 7/20 403/43 |
| 2020/0086917 A1* | 3/2020 | Seibert | ............... | B62D 7/16 |

(Continued)

FOREIGN PATENT DOCUMENTS

| CN | 1856377 A | 11/2006 |
|---|---|---|
| CN | 101084145 A | 12/2007 |
| CN | 101663191 A | 3/2010 |

(Continued)

OTHER PUBLICATIONS

English translation of First Office Action regarding corresponding CN App. No. 2020105895009; dated May 7, 2022.

*Primary Examiner* — Paul N Dickson
*Assistant Examiner* — Caitlin Anne Miller
(74) *Attorney, Agent, or Firm* — Dickinson Wright PLLC

(57) ABSTRACT

A rack assembly for a vehicle steering system includes a first rack component extending longitudinally from a first outer end to a first inner end, the first rack component having a first shoulder extending radially outwardly from a neck region to a head region. The rack assembly also includes a second rack component extending longitudinally from a second outer end to a second inner end, the second rack component having a second shoulder extending radially outwardly from a neck region to a head region. The rack assembly further includes a coupling assembly having an (Continued)

inner surface defining a hollow region that the head region of the first rack component and the head region of the second rack component are each disposed within, the inner surface having a first radial protrusion in abutment with the first shoulder and a second radial protrusion in abutment with the second shoulder.

20 Claims, 4 Drawing Sheets

(56) References Cited

U.S. PATENT DOCUMENTS

2020/0182304 A1* 6/2020 Capela .................... F16D 3/227

FOREIGN PATENT DOCUMENTS

| CN | 101663192 A1 | 3/2010 |
| CN | 108001520 A | 5/2018 |
| KR | 101337033 B1 | 12/2013 |

* cited by examiner

COUPLING FOR MULTI-PIECE STEERING SYSTEM RACK

BACKGROUND

The embodiments described herein relate to vehicle steering systems and, more particularly, to a multi-piece steering system rack and a coupling for such racks.

Some steering systems employ what is referred to as a dual pinion electric power steering (DPEPS) system. Other steering system utilize a ball screw to convert rotary steering assist power into a linear output, which may be referred to as rack assist electric power steering (REPS). Some racks of such systems may utilize two pieces to allow for the use of two different materials and/or two different diameters to obtain a typical length steering rack. The existing method of joining the two rack sections typically utilizes friction welding two rack halves to obtain the final steering rack. A welded connection has the inherent concern over weld integrity. Other methods considered for joining the rack sections have been threaded connections, but this type of connection also carries concern about joint integrity.

Some rack assemblies require a very tight angular relationship between two sets of rack teeth, with each being on different original portions of the two-piece rack assembly. This tight angular relationship allows both pinion/rack gear sets to mesh property to maintain steering system feel and durability. Unfortunately, this tight angular relationship is difficult to establish and maintain through the above-described steering rack manufacturing and assembly processes.

SUMMARY

According to one aspect of the disclosure, a rack assembly for a vehicle steering system includes a first rack component extending longitudinally from a first outer end to a first inner end, the first rack component having a first shoulder extending radially outwardly from a neck region of the first rack component to a head region of the first rack component. The rack assembly also includes a second rack component extending longitudinally from a second outer end to a second inner end, the second rack component having a second shoulder extending radially outwardly from a neck region of the second rack component to a head region of the second rack component. The rack assembly further includes a coupling assembly having an inner surface defining a hollow region that the head region of the first rack component and the head region of the second rack component are each disposed within, the inner surface having a first radial protrusion in abutment with the first shoulder and a second radial protrusion in abutment with the second shoulder.

According to another aspect of the disclosure, a rack assembly for a vehicle steering system includes a first rack component extending longitudinally from a first outer end to a first inner end, the first rack component having a first neck region extending between, and joining, a first body region, a first head region, a first shoulder extending radially outwardly from the first neck region to the first body region, and a second shoulder extending radially outwardly from the first neck region to the first head region. The rack assembly also includes a second rack component extending longitudinally from a second outer end to a second inner end, the second rack component having a second neck region extending between, and joining, a second body region, a second head region, a third shoulder extending radially outwardly from the second neck region to the second body region, and a fourth shoulder extending radially outwardly from the second neck region to the second head region. The rack assembly further includes a coupling assembly having a first half and a second half, an inner surface of the first half and the second half defining a hollow region that the first head region and the second head region are disposed within, the inner surface having a geometry corresponding to the first and second neck regions and the first and second head regions. The rack assembly yet further includes at least one biasing member disposed between, and abutting, the first inner end of the first rack component and the second inner end of the second rack component to bias the first rack component and the second rack component away from each other.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
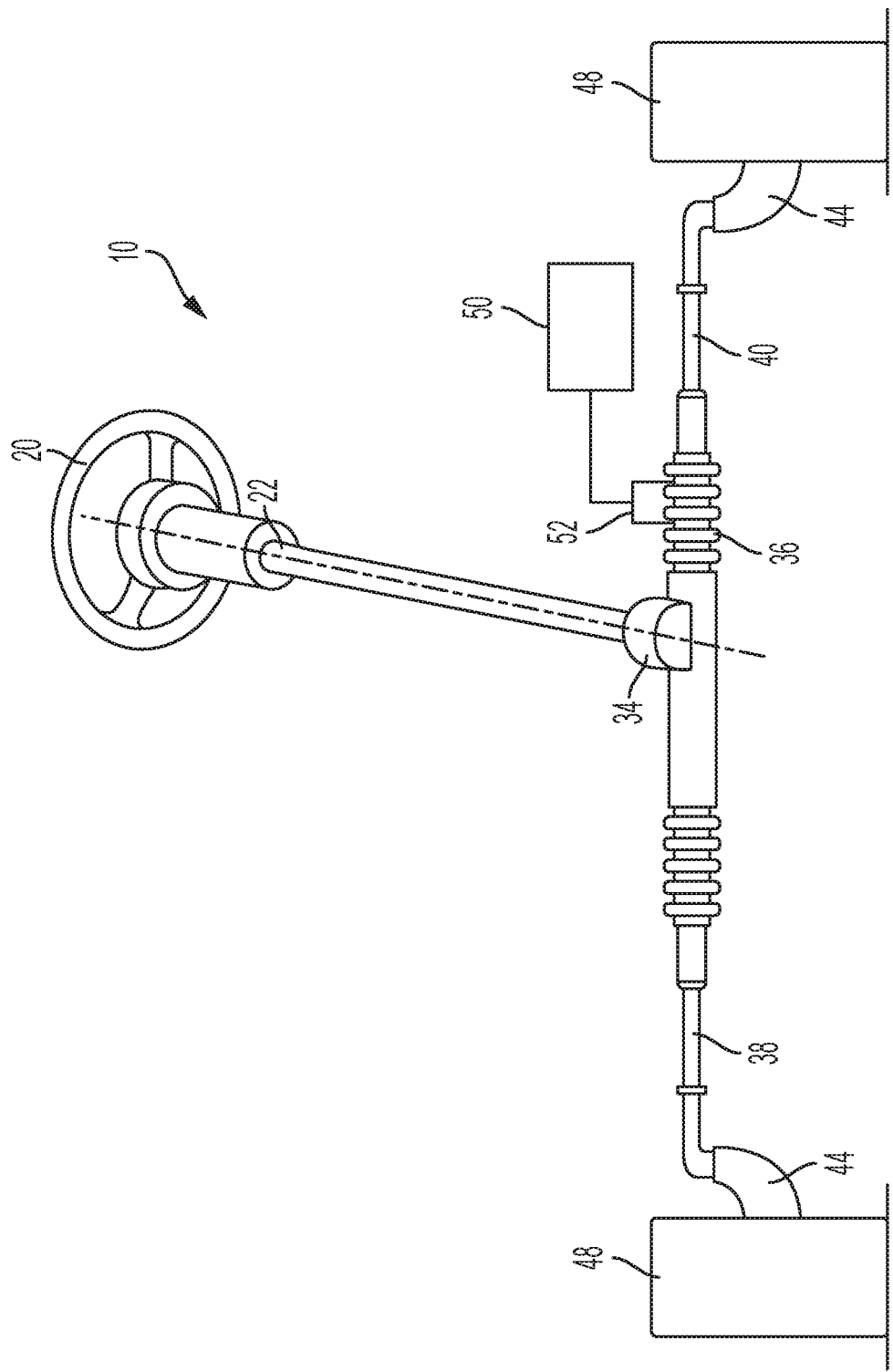
FIG. 1 is a perspective view of a vehicle steering system.

Referring now to the Figures, where the invention will be described with reference to specific embodiments, without limiting same, FIG. 1 illustrates a vehicle steering system 10 that is provided to steer a vehicle in a desired direction. The steering system 10 may include a hand wheel 20 operatively connected to a gear housing 34 via a steering column 22. The steering column 22 may be formed with one or more column sections, such as an upper column and a lower column, for example, but it is to be appreciated that various numbers of column sections may be employed. Also included is a steering mechanism, part of which is a rack assembly 36 with toothed sections thereon, tie rods 38, 40, steering knuckles 44, and road wheels 48.

The steering system 10 is an electric power steering system that utilizes a rack and pinion steering mechanism, which includes the rack assembly 36 and a pinion gear (not shown) located within gear housing 34. During operation, as hand wheel 20 is turned by a vehicle operator, the steering column 22 turns the pinion gear. Rotation of the pinion gear moves the rack assembly 36, which moves tie rods 38, 40. Tie rods 38, 40 in turn move respective steering knuckles 44, which turn the respective road wheels 48. It is to be appreciated that the steering system 10 may include fewer or more shaft or column components. Furthermore, as described above, in some embodiments a steer-by-wire system is provided where a physical connection is not present between the hand wheel 20 (or other steering input device) and a lower/forward portion of the steering column 22.

The steering system 10 includes a power steering assist assembly that assists steering effort with a motor 50 that drives a ball-screw assembly in a REPS system embodiment. In particular, a nut 52 is engaged with a ball screw portion of the rack assembly 36 to assist with translation of the rack assembly 36. In a DPEPS system, the motor 50 drives a second pinion that engages into a second set of rack teeth.

Figure 2:
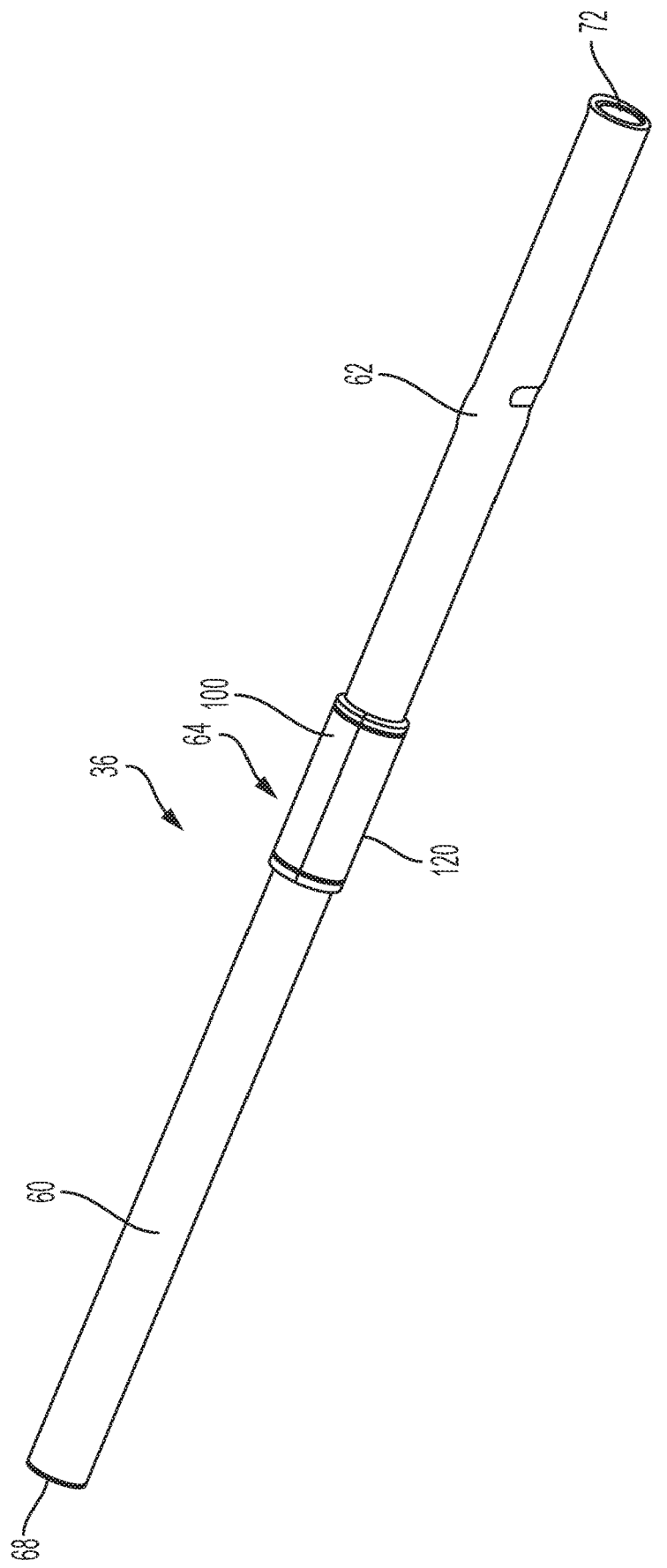
FIG. 2 is a perspective view of a rack assembly of the vehicle steering system.

Referring now to FIG. 2, the rack assembly 36 disclosed herein is shown in an assembled condition. In contrast to rack assemblies that include a single, integrally formed rack bar, or one that is formed by joining two rack pieces (e.g., welding), the rack assembly 36 disclosed herein includes a first rack component 60 and a second rack component 62 that are separate components—and remain separate components—during assembly and operation. The first rack component 60 and the second rack component 62 are coupled to each other with a coupling assembly 64. In some embodiments, the first rack component 60 and the second rack component 62 each define about half of the overall length of the rack assembly 36 upon final assembly. However, it is to be appreciated that differing lengths is contemplated. One of the first and second rack components 60, 62 is an "assist" portion of the overall rack assembly 36 and includes the ball screw portion (or assist teeth portion) of the rack assembly, while the other of the first and second rack components 60, 62 is a driven portion of the rack assembly 36.

As disclosed herein, by coupling independent and separate first and second rack components 60, 62, the rack assembly 36 provides an additional degree of freedom for the overall rack assembly to allow optimum gear mesh with the toothed portions of the rack assembly 36 while providing all of the other requirements of a steering rack. This overcomes the difficulty associated with establishing and maintaining a tight angular relationship between two sets of rack teeth during all steering rack manufacturing and assembly processes.

Figure 5:
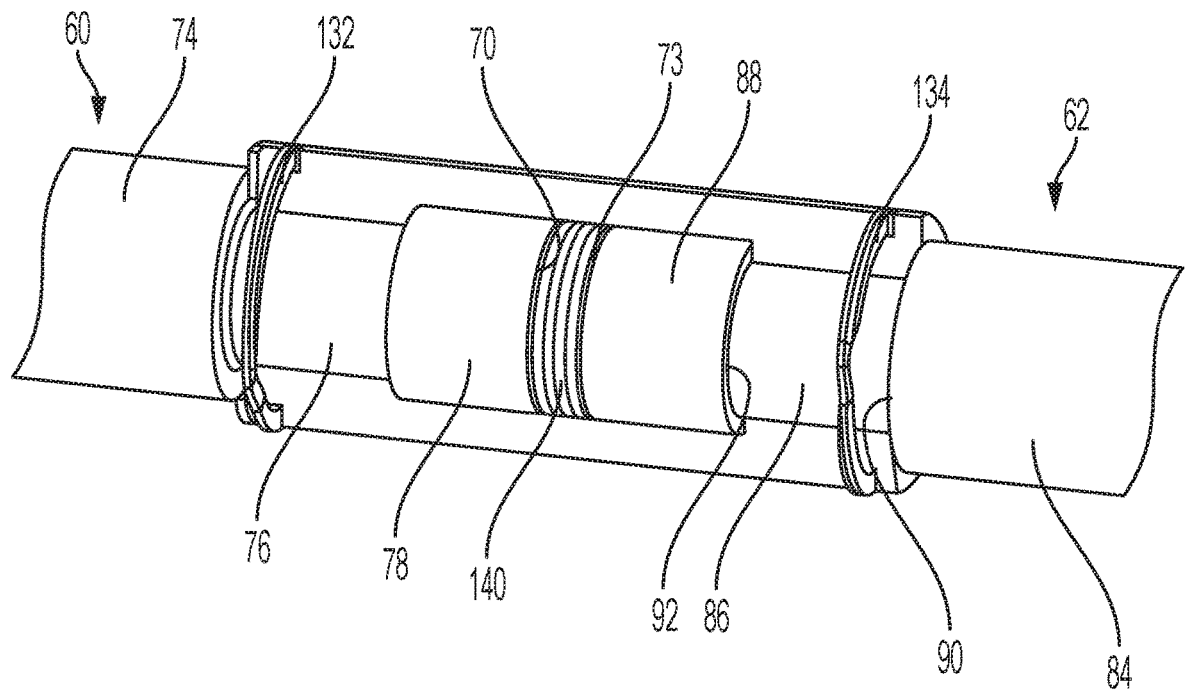
FIG. 5 is a perspective view of the rack assembly, with a portion of the coupling removed.

The first rack component 60 extends in a longitudinal direction from a first outer end 68 to a first inner end 70 (FIGS. 3 and 5) and the second rack component 62 extends from a second outer end 72 to a second inner end 73 (FIG. 5).

Figure 3:
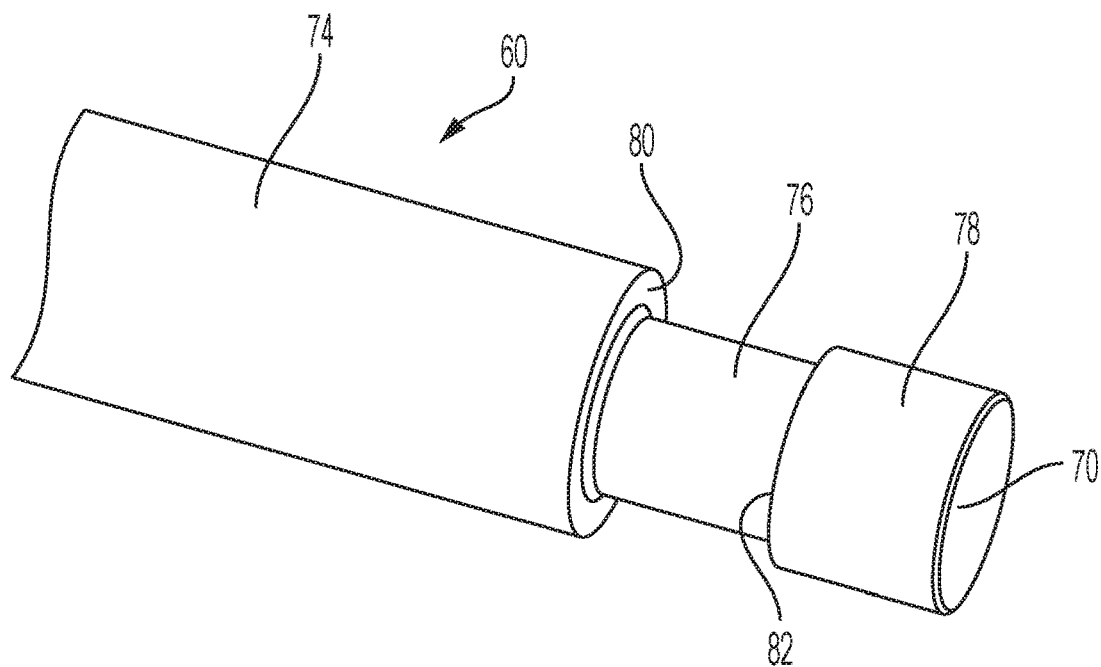
FIG. 3 is a perspective view of a first portion of the rack assembly.

Referring now to FIG. 3, a portion of the first rack component 60 is illustrated in greater detail. In particular, a body region 74 of the first rack component 60 is shown, with a neck region 76 joining the body region 74 to a head region 78. The respective outer diameters of the body region 74 and the head region 78 are each greater than the outer diameter of the neck region 76. A first shoulder 80 extends radially outward from the neck region 76 to connect the neck region 76 to the body region 74. Similarly, a second shoulder 82 extends radially outward from the neck region 76 to connect the neck region 76 to the head region 78. In some embodiments, one or both of the first and second shoulders 80, 82 are oriented perpendicularly relative to the neck region 76 and the head region 78, but slight angles deviating therefrom are contemplated.

The region proximate the second inner end 73 of the second rack component 62 is structured similar to the first rack component 60, as shown in FIG. 5. In particular, the second rack component 62 includes a body region 84, with a neck region 86 joining the body region 84 to a head region 88. The respective outer diameters of the body region 84 and the head region 88 are each greater than the outer diameter of the neck region 86. A third shoulder 90 extends radially outward from the neck region 86 to connect the neck region 86 to the body region 84. Similarly, a fourth shoulder 92 extends radially outward from the neck region 86 to connect the neck region 86 to the head region 88. In some embodiments, one or both of the third and fourth shoulders 90, 92 are oriented perpendicularly relative to the neck region 86 and the head region 88, but slight angles deviating therefrom are contemplated.

Figure 4:
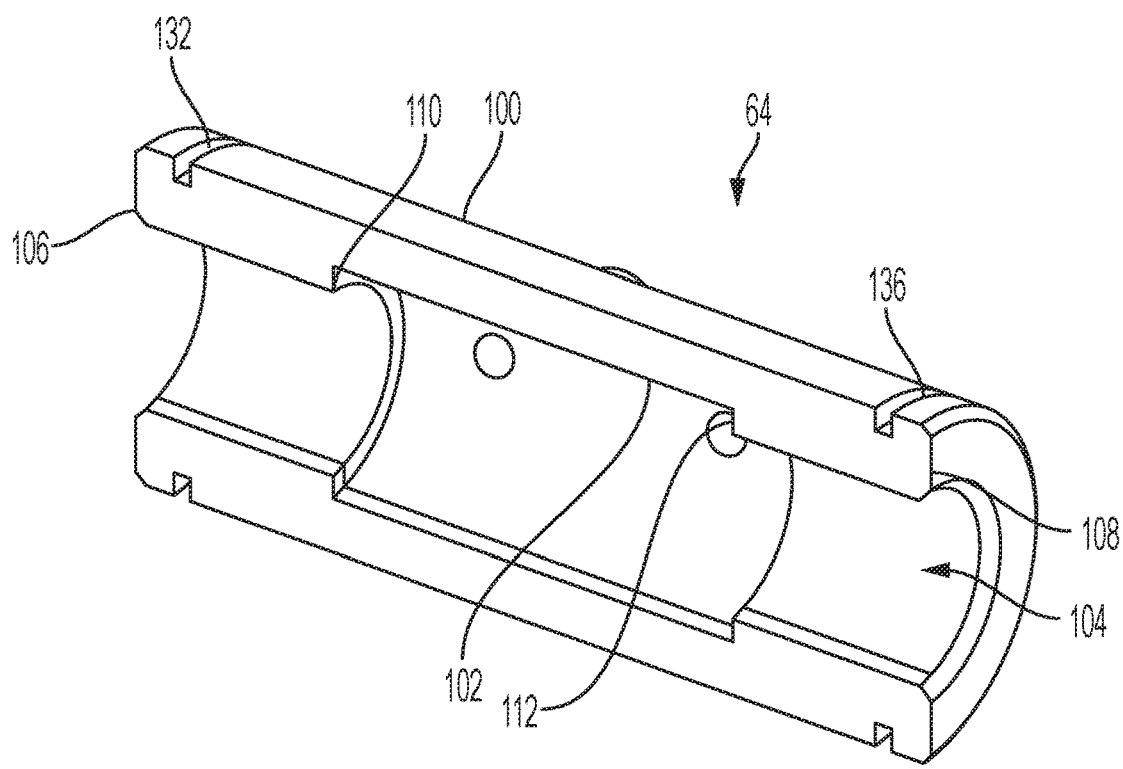
FIG. 4 is a coupling for two portions of the rack assembly.

Referring now to FIGS. 4 and 5, a portion of the coupling assembly 64 is illustrated, with a portion removed to illustrate interior features of the coupling assembly 64. In particular, a first half 100 of the coupling assembly 64 is shown. The first half 100 includes an inner surface 102 that defines a hollow interior region 104. The head region 78, 88 of the first and second rack component 60, 62, respectively, and at least a portion of the neck region 76, 86 of the first and second rack component 60, 62, respectively, are each configured to be disposed within the hollow interior region 104 in an assembled condition (FIG. 5). The interior surface 102 extends axially from a first end 106 to a second end 108 along a geometric profile that corresponds substantially to the neck regions 76, 86 and the head regions 78, 88 of the first and second rack components 60, 62, as shown in FIG. 5. Specifically, the inner surface 102 includes a first radial protrusion 110 that is in abutment with the second shoulder 82 and a second radial protrusion 112 that is in abutment with the fourth shoulder 92 of the first and second rack components 60, 62. The portion of the inner surface 102 that extends between the first and second radial protrusions 110, 112 defines a larger diameter portion of the hollow interior region 104 to accommodate the head regions 78, 88 which are each respectively larger than the neck regions 76, 86 of their rack components 60, 62. The first and second radial protrusions 110, 112 extend radially inwardly to an extent sufficient to prevent axial withdrawal of the first and/or second rack components 60, 62.

Although the interior of the first half 100 of the coupling assembly 64 is illustrated, it is to be appreciated that a second half 120 (FIGS. 2 and 6) of the coupling assembly 64 is simply a substantially replica of the first half 100, both externally and internally. Together, the first half 100 and the second half 120 radially and axially constrain the first and second rack components 60, 62 when secured to each other. By separating the coupling assembly 64 into two components, the head regions 78, 88 are each able to be positioned appropriately within the larger interior hollow region 104 and then captured in the above-described manner.

Securement of the halves 100, 120 of the coupling assembly 64 is made with at least one retaining ring disposed within a groove formed in the outer diameter of the coupling assembly 64. In the illustrated embodiment, a first retaining ring 130 is disposed within a first groove 132 and a second retaining ring 134 is disposed within a second groove 136. It is contemplated that more retaining rings are provided for additional resistance to separation of the halves 100, 120. In some embodiments, the retaining rings 130, 134 are each a spiral would ring, but alternative elements are contemplated. For example, in some embodiments, a steel tube that is pressed over the outer diameter of the coupling halves may be employed to resist separation of the halves 100, 102. In such an embodiment, the tube length would be substantially equal to the length of the coupling halves 100, 102.

In some embodiments, the retaining rings 130, 134 are not necessary. Such embodiments provide support for the coupling halves 100, 120 with matching diameter/contour that is present in a rack housing.

Referring to FIG. 5, to reduce the quantity of tight tolerance features at and within the coupling assembly joint, one or more biasing members 140 are disposed between, and in abutment with, the first inner end 70 and the second inner end 73 to bias the first rack component 60 and the second rack component 62 away from each other. In some embodiments, the biasing member(s) 140 is a conical spring washer. The biasing member(s) 140 exert an outward force on the inner end of each rack component 60, 62 to de-lash the rack assembly 36 and prevent rattle in the rack assembly 36. In an assembly process, the biasing members 140 are compressed and the rack components 60, 62 are positioned within the coupling assembly 64 prior to installation of the above-described retaining rings 130, 134.

The above-described coupling assembly 64 effectively joins the first and second rack components 60, 62 together, but allows the components to rotate independently of each other, thereby providing an additional degree of freedom for the rack assembly 36.

Figure 6:
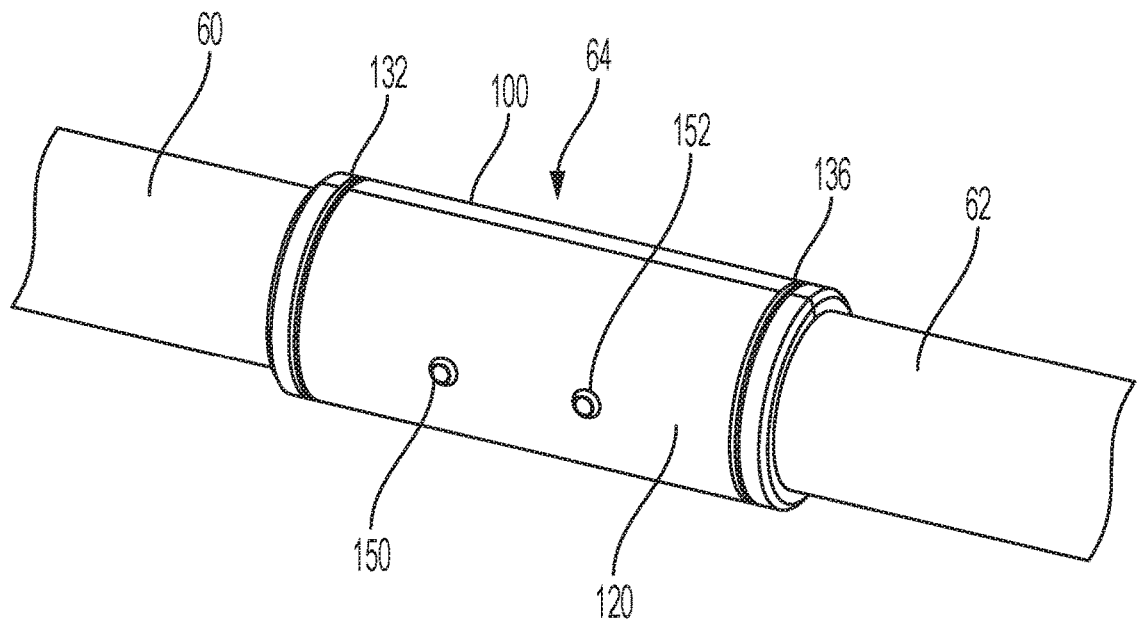
FIG. 6 is a perspective view of the coupling assembled with the portions of the rack assembly.

FIG. 6 illustrates an embodiment of the rack assembly 36 that facilitates the transmission of torque from one of the rack components 60 or 62 to the other rack component 60 or 62. In such an embodiment where the above-described additional degree of freedom is not required or desired, torque transmission is facilitated by mechanically fastening each rack component 60, 62 to the coupling assembly 64. In particular, a first mechanical fastener 150 extends through the coupling assembly 64 and into the first rack component 60. Similarly, a second mechanical fastener 152 extends through the coupling assembly 64 and into the second rack component 62. In some embodiments, the mechanical fasteners 150, 152 are rolled spring pins.

Any of the embodiments disclosed herein could include a coupling assembly (i.e., first and second halves 100, 120) that is manufactured from sintered metal with little to no machining required, but alternative materials and manufacturing processes are contemplated.

The disclosed embodiments of the rack assembly 36 allow the separate rack components 60, 62 to be formed of different material and/or have differing diameters. The embodiments disclosed herein also facilitate having an assist portion of the rack that may be a common design that is used in various vehicles by mating with an application specific "steering" portion of the rack. This allows mass manufacture of the assist portion to reduce cost.

Due to substantial manufacturing cost of dual pinion assist electric power steering (DPEPS) racks, the disclosed embodiments provide "repair" of the rack assembly 36 by replacing one end of the rack assembly 36, rather than scrapping out the rack assembly in its entirety.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, what is claimed is:

1. A rack assembly for a vehicle steering system comprising:
   a first rack component extending longitudinally from a first outer end to a first inner end, the first rack component having a first shoulder extending radially outwardly from a neck region of the first rack component to a head region of the first rack component;
   a second rack component extending longitudinally from a second outer end to a second inner end, the second rack component having a second shoulder extending radially outwardly from a neck region of the second rack component to a head region of the second rack component; and
   a coupling assembly having an inner surface defining a hollow region that the head region of the first rack component and the head region of the second rack component are each disposed within, the inner surface having a first radial protrusion in abutment with the first shoulder and a second radial protrusion in abutment with the second shoulder.

2. The rack assembly of claim 1, wherein the coupling assembly comprises a plurality of components.

3. The rack assembly of claim 2, wherein the coupling assembly includes a first half and a second half.

4. The rack assembly of claim 3, wherein the first half is secured to the second half with a first retaining ring disposed in a first groove formed within an outer diameter of the coupling assembly.

5. The rack assembly of claim 4, further comprising a second retaining ring disposed in a second groove formed within the outer diameter of the coupling assembly.

6. The rack assembly of claim 5, wherein at least one of the first and second retaining rings is a spiral wound ring.

7. The rack assembly of claim 1, further comprising at least one biasing member disposed between, and abutting, the first inner end of the first rack component and the second inner end of the second rack component to bias the first rack component and the second rack component away from each other.

8. The rack assembly of claim 7, wherein the at least one biasing member is at least one conical spring washer.

9. The rack assembly of claim 1, wherein the coupling assembly is formed of sintered metal.

10. The rack assembly of claim 1, wherein the first rack component includes a first body region, the neck region of the first rack component joining the body region and the head region of the first rack component, the second rack component including a second body region, the neck region of the second rack component joining the body region and the head region of the second rack component.

11. The rack assembly of claim 10, wherein the body region of the first rack component has an outer diameter that is different than an outer diameter of the second rack component.

12. The rack assembly of claim 1, wherein the first rack component is formed of a material that is different than the material of the second rack component.

13. The rack assembly of claim 1, wherein the first rack component and the second rack component may rotate independently of each other.

14. The rack assembly of claim 1, further comprising:
   a first mechanical fastener fixing the coupling to the first rack component; and
   a second mechanical fastener fixing the coupling to the second rack component, wherein torque of one of the first and second rack components transmits torque to the other of the first and second rack components.

15. The rack assembly of claim 14, wherein the first and second mechanical fasteners are rolled spring pins.

16. A rack assembly for a vehicle steering system comprising:
   a first rack component extending longitudinally from a first outer end to a first inner end, the first rack component having a first neck region extending between, and joining, a first body region, a first head region, a first shoulder extending radially outwardly from the first neck region to the first body region, and a second shoulder extending radially outwardly from the first neck region to the first head region;

a second rack component extending longitudinally from a second outer end to a second inner end, the second rack component having a second neck region extending between, and joining, a second body region, a second head region, a third shoulder extending radially outwardly from the second neck region to the second body region, and a fourth shoulder extending radially outwardly from the second neck region to the second head region;

a coupling assembly having a first half and a second half, an inner surface of the first half and the second half defining a hollow region that the first head region and the second head region are disposed within, the inner surface having a geometry corresponding to the first and second neck regions and the first and second head regions; and at least one biasing member disposed between, and abutting, the first inner end of the first rack component and the second inner end of the second rack component to bias the first rack component and the second rack component away from each other.

17. The rack assembly of claim 16, further comprising:
a first retaining ring disposed in a first groove formed within an outer diameter of the coupling assembly; and
a second retaining ring disposed in a second groove formed within the outer diameter of the coupling assembly, the first and second retaining rings securing the first half to the second half of the coupling assembly.

18. The rack assembly of claim 16, wherein the coupling assembly is disposed within a bore of a rack housing, the bore dimensioned to secure the first half to the second half of the coupling assembly.

19. The rack assembly of claim 16, further comprising:
a first mechanical fastener fixing the coupling to the first rack component; and
a second mechanical fastener fixing the coupling to the second rack component, wherein torque of one of the first and second rack components transmits torque to the other of the first and second rack components.

20. The rack assembly of claim 16, further comprising a tube surrounding the coupling assembly to secure the first half to the second half.

* * * * *